United States Patent
Liu et al.

(10) Patent No.: US 9,479,211 B2
(45) Date of Patent: Oct. 25, 2016

(54) HOUSING, ELECTRONIC DEVICE USING THE SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Xu Liu, Shenzhen (CN); Yi Yang, Shenzhen (CN); Po-Feng Ho, New Taipei (TW)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 131 days.

(21) Appl. No.: 14/573,900

(22) Filed: Dec. 17, 2014

(65) Prior Publication Data
US 2015/0245520 A1    Aug. 27, 2015

(30) Foreign Application Priority Data
Feb. 26, 2014  (CN) .......................... 2014 1 0065577

(51) Int. Cl.
*G06F 1/16* (2006.01)
*H04B 1/3888* (2015.01)

(52) U.S. Cl.
CPC .................................. *H04B 1/3888* (2013.01)

(58) Field of Classification Search
CPC ........................... G06F 1/1605; G06F 1/1626
See application file for complete search history.

(56) References Cited

U.S. PATENT DOCUMENTS

| | | | |
|---|---|---|---|
| 2007/0257398 A1* | 11/2007 | Moncrieff | B29C 45/14811 264/272.11 |
| 2012/0118492 A1* | 5/2012 | Coulson | B29C 43/02 156/242 |
| 2012/0164419 A1* | 6/2012 | Sakagami | B32B 27/08 428/216 |
| 2014/0266924 A1* | 9/2014 | Hwang | H01Q 1/243 343/702 |
| 2015/0241921 A1* | 8/2015 | Gu | H04M 1/0202 361/679.56 |
| 2015/0289372 A1* | 10/2015 | Deng | H05K 1/115 361/679.02 |

* cited by examiner

*Primary Examiner* — Anthony Q Edwards
(74) *Attorney, Agent, or Firm* — Zhigang Ma

(57) ABSTRACT

A housing includes a main body, the main body includes a plurality of metal sheets and a plurality of resin layers, each metal sheet alternates with one resin layer, each two adjacent metal sheets are fixed together by one resin layer located between the two metal sheets. An electronic device using the housing is also provided.

20 Claims, 6 Drawing Sheets

HOUSING, ELECTRONIC DEVICE USING THE SAME

FIELD

The subject matter herein generally relates to a housing, and an electronic device using the housing.

BACKGROUND

A housing is an important component in electronic devices.

BRIEF DESCRIPTION OF THE FIGURES

Implementations of the present technology will now be described, by way of example only, with reference to the attached figures.

DETAILED DESCRIPTION

Figure 1:
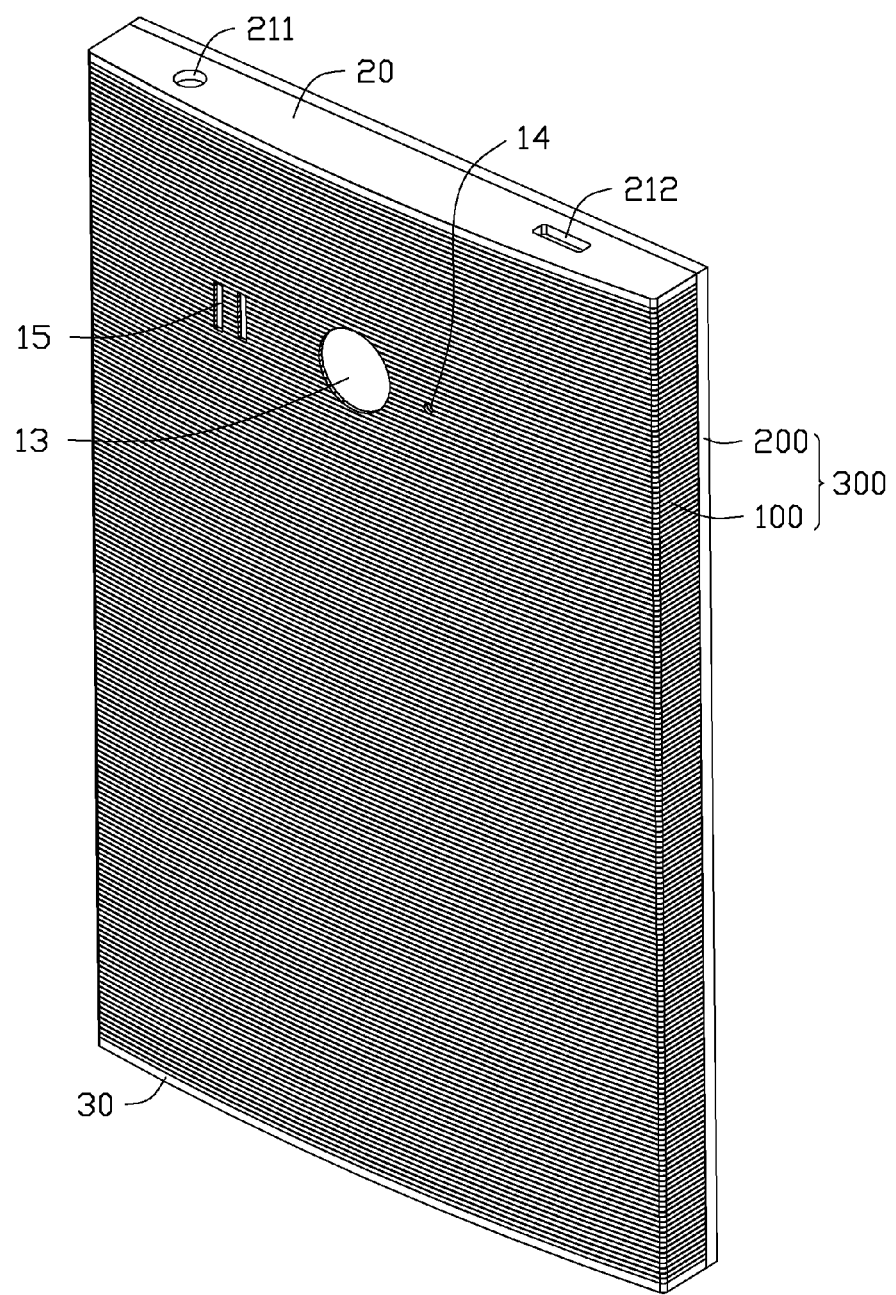
FIG. 1 is an isometric view of an electronic device, according to an exemplary embodiment.

It will be appreciated that for simplicity and clarity of illustration, where appropriate, reference numerals have been repeated among the different figures to indicate corresponding or analogous elements. In addition, numerous specific details are set fourth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented. The term "comprising," when utilized, means "including, but not necessarily limited to"; it specifically indicates open-ended inclusion or membership in the so-described combination, group, series and the like.

Figure 2:
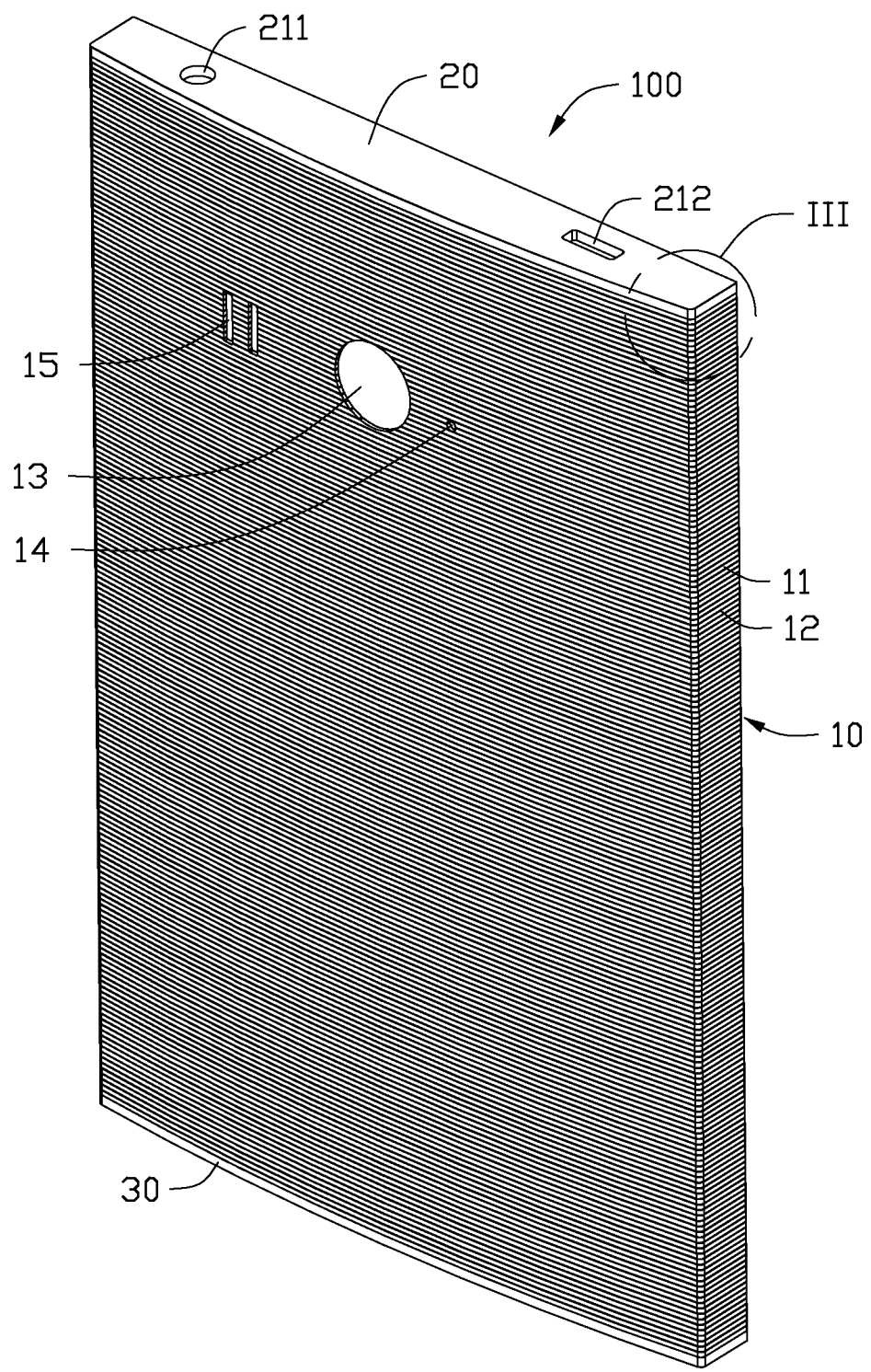
FIG. 2 is an isometric view of a housing of the electronic device shown in FIG. 1.

FIGS. 1-2 illustrate an electronic device 300, such as a mobile phone, a personal digital assistant or a panel computer. The electronic device 300 includes a body 200, a housing 100 mounted on the body 200 and an antenna (not shown) located in the housing 100.

The housing 100 includes a main body 10, a first side wall 20 and a second side wall 30 substantially parallel with the first side wall 20. The first side wall 20 and the second side wall 30 are located on the two opposite ends of the main body 10.

Figure 3:
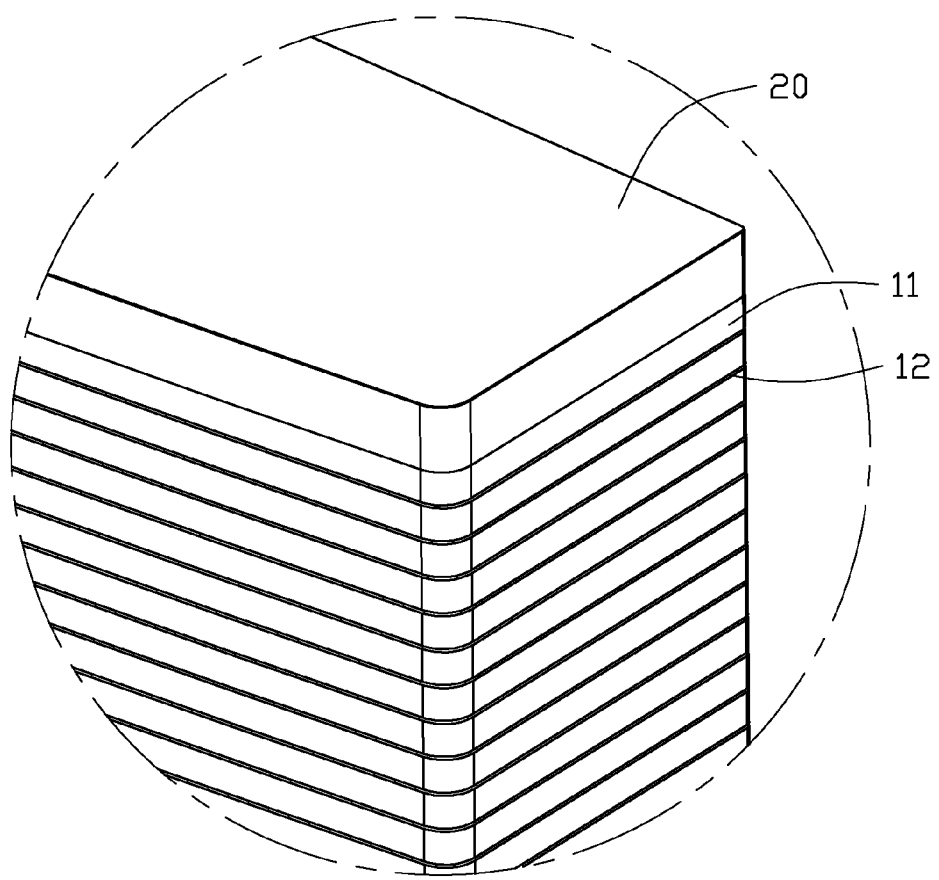
FIG. 3 is an enlarged, isometric view of a circled portion I shown in FIG. 2.
Figure 4:
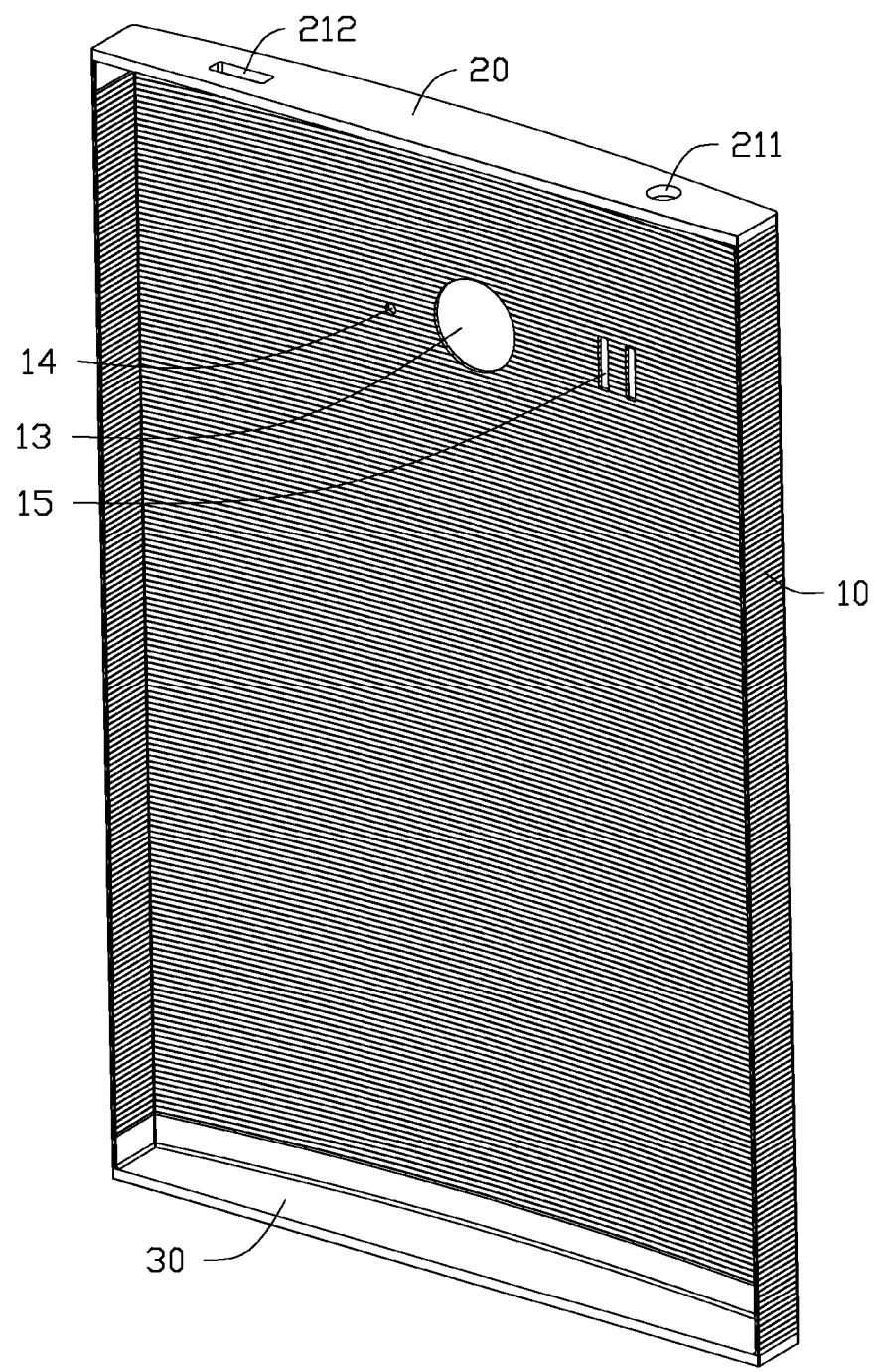
FIG. 4 is similar to FIG. 2, but shown from another angle.
Figure 5:
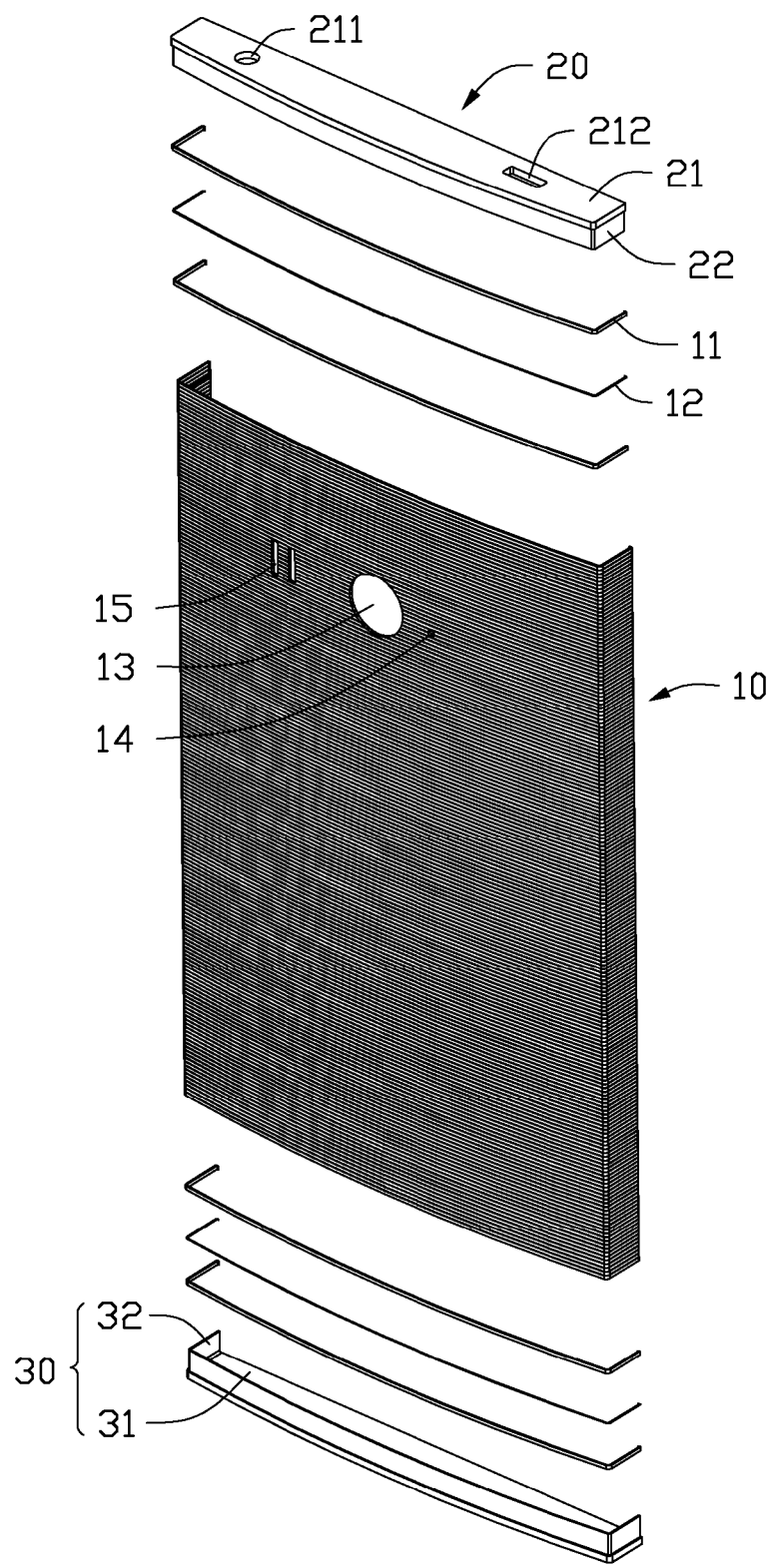
FIG. 5 is an exploded, isometric view of the main body shown in FIG. 2.

FIGS. 3-5 illustrate that the main body 10 can be a thin sheet-shaped, and includes a plurality of metal sheets 11 and a plurality of resin layers 12. Each metal sheet 11 alternates with one resin layer 12. The metal sheets 11 are fixed together by the resin layers 12. The shape of the metal sheet 11 and resin layers 12 can be changed according to the demand of the electronic device 300.

The metal sheets 11 are substantially U-shaped. Each metal sheet 11 has a thickness of about 0.5 mm to about 1.0 mm along a direction from a resin layer 12 located at one side of the metal sheet 11 to another adjacent resin layer 12 located at an opposite side of the metal sheet 11. Each resin layer 12 has a thickness of about 0.03 mm to about 0.08 mm along a direction from a metal sheet 11 located at one side of the resin layer 12 to another adjacent metal sheet 11 located at an opposite side of the resin layer 12. The metal sheets 11 have the same shape as the resin layers 12. The antenna is located in the housing 100 and adjacent the metal sheets 11.

The resin layers 12 can be selected from a group consisting of epoxy adhesive, chloroprene adhesive, polyurethane adhesive, acrylic adhesive, organic silica gel, hot-melt adhesive, and so on. Each two adjacent metal sheets 11 are connected with each other by one resin layer 12 located between the two metal sheets 11. The resin layers 12 have the same shape as the metal sheets 11. The resin layers 12 are substantially U-shaped. Each metal sheet 11 alternates with one resin layer 12, the signal of the electronic device 300 can pass through the resin layers 12, so that the housing 100 can protect the signal from being shielded. Because the housing 100 has the metal sheets 11 and the resin layer 12 alternating with each other give the user a good tactile feeling. Furthermore, the resin layers 12 can protect the electronic device 300 from being damaged.

The main body 10 further includes a circular camera hole 13, a circular noise reduction hole 14 and two oblong flashlight holes 15 substantially parallel to each other, the camera hole 13 is located between the noise reduction hole 14 and the flashlight holes 15. The diameter of the noise reduction hole 14 is smaller than the diameter of the camera hole 13.

The first side wall 20 includes a first plate 21 and a first clamping portion 22 integrated with the first plate 21. The first plate 21 defines a circular earphone hole 211 and an oblong charging hole 212, the earphone hole 211 and the charging hole 212 are located at the two opposite ends of the first plate 21, respectively. The first clamping portion 22 is substantially U-shaped, and perpendicularly connected with the first plate 21. The first side wall 20 is connected to one end of the main body 10 with the first clamping portion 22. Practically speaking, the first side wall 20 can be formed by an injection molding process; the first side wall 20 can be assembled on an end of the main body 10. In at least one exemplary embodiment, the main body 10 can be positioned in a mold (not shown), then liquid resin composition can be filled into the mold to form the first side wall 20 on an end of the main body 10.

The second side wall 30 includes a second plate 31 and a second clamping portion 32 integrated with the second plate 31. The second clamping portion 32 is substantially U-shaped, and perpendicularly connected with the second plate 31. The second side wall 30 is connected to an end of the main body 10 away from the first side wall 20 with the second clamping portion 32. Practically speaking, the second side wall 30 can be formed by injection molding; the second side wall 30 can be assembled on an end of the main body 10 away from the first side wall 20. In at least one exemplary embodiment, the main body 10 can be positioned in a mold (not shown), then liquid resin composition can be filled into the mold to form the second side wall 30 on an end of the main body 10 away from the first side wall 20.

The first side wall 20 and the second side wall 30 can be made of resin. The resin for making the first side wall 20 and the second side wall 30 provides good elasticity, so the first side wall 20 and the second side wall 30 can protect the electronic device 300 from being damaged; thereby the electronic device 300 is shockproof. Furthermore, the signal of the electronic device 300 can pass through the first side wall 20 and the second side wall 30, the first side wall 20 and the second side wall 30 can protect the signal from being shielded by the housing 100.

In at least one exemplary embodiment, the housing 100 can further include a third side wall (not shown) and a fourth side wall (not shown) substantially parallel with the third side wall. The third side wall can be connected with the first side wall 20 and the second side wall 30. The fourth side wall can also be connected with the first side wall 20 and the second side wall 30. The third side wall and the fourth side wall can be located on the two opposite ends of the main body 10. The third side wall and the fourth side wall can be made of resin. The resin for making the third side wall and the fourth side wall provides good elasticity, so the third side wall and the fourth side wall can protect the electronic device 300 from being damaged. Furthermore, the signal of the electronic device 300 can pass through the third side wall and the fourth side wall, the third side wall and the fourth side wall can protect the signal from being shielded by the housing 100.

Figure 6:
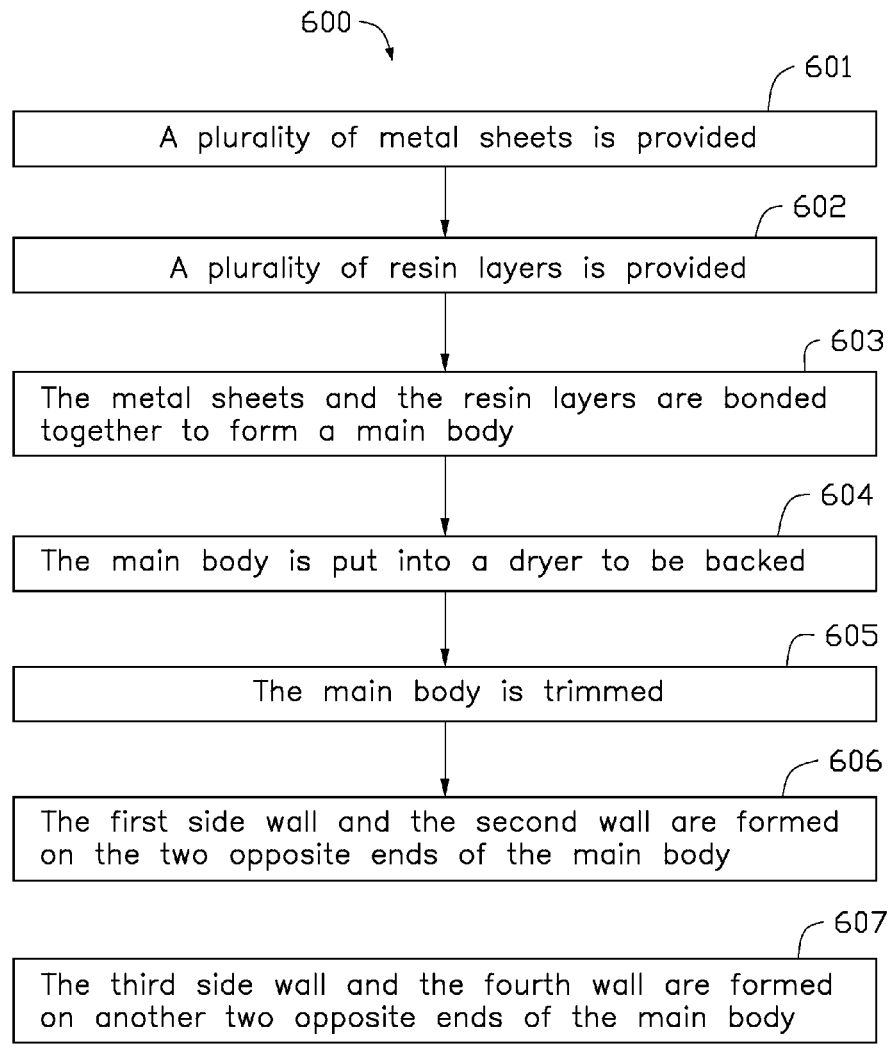
FIG. 6 is a flow chart of a method for making a housing in accordance with an exemplary embodiment.

Referring to FIG. 6, a flowchart is presented in accordance with an example embodiment. The example method 600 is provided by way of example, as there are a variety of ways to carry out the method. The method 600 described below can be carried out using the configurations illustrated in FIGS. 1-5, for example, and various elements of these figures are referenced in explaining example method 600. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The example method 600 can begin at block 601.

At block 601 a plurality of U-shaped metal sheets 11 is provided.

At block 602, a plurality of resin layers 12 is provided. The resin layers 12 are substantially U-shaped, and have the same shape as the metal sheets 11. The resin layers 12 can bond the metal sheets 11 together, and can be selected from a group consisting of epoxy adhesive, chloroprene adhesive, polyurethane adhesive, acrylic adhesive, organic silica gel, hot-melt adhesive, and so on.

At block 603, each two adjacent metal sheets 11 are bonded together by one resin layer 12 located between the two adjacent metal sheets 11; thereby a main body 10 is formed. Each metal sheet 11 has a thickness of about 0.5 mm to about 1.0 mm along a direction from a resin layer 12 located at one side of the metal sheet 11 to another adjacent resin layer 12 located at an opposite side of the metal sheet 11. Each resin layer 12 has a thickness of about 0.03 mm to about 0.08 mm along a direction from a metal sheet 11 located at one side of the resin layer 12 to another adjacent metal sheet 11 located at an opposite side of the resin layer 12. The metal sheets 11 have the same shape as the resin layers 12.

At block 604, the main body 10 is then put into a dryer to be backed so that the metal sheets 11 can be strongly bonded with each other by the resin layers 12.

At block 605, the main body 10 can be trimmed to remove the residue of the resin layers 12 by a computer numerical control (CNC).

At block 606, The first side wall 20 and the second wall 30 can be connected with the main body 10 by the following two methods:

In a first method, the first side wall 20 and the second wall 30 are respectively formed by the injection molding process. The first side wall 20 includes a first plate 21 and a first clamping portion 22 integrated with the first plate 21. The first plate 21 defines an earphone hole 211 and a charging hole 212, the earphone hole 211 and the charging hole 212 are respectively located at the two opposite ends of the first plate 21. The first clamping portion 22 is substantially U-shaped, and perpendicularly connected with the first plate 21.

The second side wall 30 includes a second plate 31 and a second clamping portion 32 integrated with the second plate 31. The second clamping portion 32 is substantially U-shaped, and perpendicularly connected with the second plate 31.

Then, the first side wall 20 is assembled on one end of the main body 10 by the first clamping portion 22, the second side wall 30 is assembled on the opposite end of the main body 10 by the second clamping portion 32, thereby a housing 100 is formed.

In a second method, the main body 10 is put into a mold (not shown), liquid resin composition is filled into the mold to form the first side wall 20 and the second wall 30 on the two opposite ends of the main body 10, and thereby a housing 100 is formed. The first side wall 20 includes a first plate 21 and a first clamping portion 22 integrated with the first plate 21. The first plate 21 defines an earphone hole 211 and a charging hole 212, the earphone hole 211 and the charging hole 212 are located at the two opposite ends of the first plate 21, respectively. The first clamping portion 22 is substantially U-shaped, and perpendicularly connected with the first plate 21. The second side wall 30 includes a second plate 31 and a second clamping portion 32 integrated with the second plate 31. The second clamping portion 32 is substantially U-shaped, and perpendicularly connected with the second plate 31. The first side wall 20 is connected to one end of the main body 10 with the first clamping portion 22; the second side wall 30 is connected to the opposite end of the main body 10 with the second clamping portion 32.

At block 607, in at least one exemplary embodiment, a third side wall (not shown) and a fourth side wall (not shown) substantially parallel with the third side wall can also be located on the two opposite ends of the main body 10. The methods of forming the third side wall and the fourth side wall are the same as the methods of forming the first side wall and the second side wall.

The third side wall can be connected with the first side wall 20 and the second side wall 30. The fourth side wall can also be connected with the first side wall 20 and the second side wall 30. The third side wall and the fourth side wall can be made of resin.

It is to be understood, however, that even through numerous characteristics and advantages of the present disclosure have been set fourth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A housing, comprising:
   a main body, comprising a plurality of metal sheets and a plurality of resin layers, each metal sheet alternating with one resin layer, each two adjacent metal sheets being fixed together by one resin layer located between the two metal sheets.

2. The housing as claimed in claim 1, wherein each metal sheet has a thickness of about 0.5 mm to about 1.0 mm along a direction from a resin layer located at one side of the metal sheet to another adjacent resin layer located at an opposite side of the metal sheet, each resin layer has a thickness of about 0.03 mm to about 0.08 mm along a direction from a metal sheet located at one side of the resin layer to another adjacent metal sheet located at an opposite side of the resin layer.

3. The housing as claimed in claim 1, wherein the main body further includes a first side wall and a second side wall, the first side wall and the second side wall are respectively located on the two opposite ends of the main body, the first side wall and the second side wall are made of resin.

4. The housing as claimed in claim 3, wherein the first side wall includes a first plate and a first clamping portion integrated with the first plate, the first side wall is connected to one end of the main body with the first clamping portion.

5. The housing as claimed in claim 4, wherein the first plate defines an earphone hole and a charging hole, the earphone hole and the charging hole are located at the two opposite ends of the first plate, respectively.

6. The housing as claimed in claim 1, wherein the main body further includes a camera hole, a noise reduction hole and two flashlight holes parallel to each other, the camera hole is located between the noise reduction hole and the flashlight holes, the diameter of the noise reduction hole is smaller than the diameter of the circular camera hole.

7. The housing as claimed in claim 1, wherein the resin layers are selected from a group consisting of epoxy adhesive, chloroprene adhesive, polyurethane adhesive, acrylic adhesive, organic silica gel and hot-melt adhesive.

8. The housing as claimed in claim 3, wherein the main body further includes a third side wall and a fourth side wall parallel with the third side wall, the third side wall is connected with the first side wall and the second side wall, the fourth side wall is connected with the first side wall and the second side wall, the third side wall and the fourth side wall is located on the two opposite ends of the main body.

9. The housing as claimed in claim 4, wherein the second side wall includes a second plate and a second clamping portion integrated with the second plate, the second side wall is connected to an opposite end of the main body away from the first side wall with the second clamping portion.

10. An electronic device, comprising:
    a body; and
    a housing mounted on the body, the housing including a main body, the main body comprising a plurality of metal sheets and a plurality of resin layers, each metal sheet alternating with one resin layer, each two adjacent metal sheets being fixed together by one resin layer located between the two metal sheets.

11. The electronic device as claimed in claim 10, wherein each metal sheet has a thickness of about 0.5 mm to about 1.0 mm along a direction from a resin layer located at one side of the metal sheet to another adjacent resin layer located at an opposite side of the metal sheet, each resin layer has a thickness of about 0.03 mm to about 0.08 mm along a direction from a metal sheet located at one side of the resin layer to another adjacent metal sheet located at an opposite side of the resin layer.

12. The electronic device as claimed in claim 10, wherein the main body further includes a first side wall and a second side wall, the first side wall and the second side wall are respectively located on the two opposite ends of the main body, the first side wall and the second side wall are made of resin.

13. The electronic device as claimed in claim 12, wherein the first side wall includes a first plate and a first clamping portion integrated with the first plate, the first side wall is connected to one end of the main body with the first clamping portion.

14. The electronic device as claimed in claim 13, wherein the first plate defines an earphone hole and a charging hole, the earphone hole and the charging hole are respectively located at the two opposite ends of the first plate.

15. The electronic device as claimed in claim 10, wherein the main body further includes a camera hole, a noise reduction hole and two flashlight holes parallel to each other, the camera hole is located between the noise reduction hole and the flashlight holes, the diameter of the noise reduction hole is smaller than the diameter of the circular camera hole.

16. The electronic device as claimed in claim 10, wherein the resin layers are selected from a group consisting of epoxy adhesive, chloroprene adhesive, polyurethane adhesive, acrylic adhesive, organic silica gel and hot-melt adhesive.

17. The electronic device as claimed in claim 12, wherein the main body further includes a third side wall and a fourth side wall parallel with the third side wall, the third side wall is connected with the first side wall and the second side wall, the fourth side wall is connected with the first side wall and the second side wall, the third side wall and the fourth side wall is located on the two opposite ends of the main body.

18. The electronic device as claimed in claim 13, wherein the second side wall includes a second plate and a second clamping portion integrated with the second plate, the second side wall is connected to an opposite end of the main body away from the first side wall with the second clamping portion.

19. An electronic device, comprising:
    a body; and
    a housing mounted on the body, the housing including a main body, the main body comprising a plurality of metal sheets and a plurality of resin layers, each metal sheet alternating with one resin layer, each two adjacent metal sheets being fixed together by one resin layer located between the two metal sheets; and
    an antenna located in the housing and adjacent the metal sheets.

20. The electronic device as claimed in claim 19, wherein each metal sheet has a thickness of about 0.5 mm to about 1.0 mm along a direction from a resin layer located at one side of the metal sheet to another adjacent resin layer located at an opposite side of the metal sheet, each resin layer has a thickness of about 0.03 mm to about 0.08 mm along a direction from a metal sheet located at one side of the resin layer to another adjacent metal sheet located at an opposite side of the resin layer.

* * * * *